United States Patent
Tselepis

(10) Patent No.: US 10,577,801 B2
(45) Date of Patent: Mar. 3, 2020

(54) SILICONE MEMBRANES

(71) Applicant: Gaco Western, LLC, Waukesha, WI (US)

(72) Inventor: Arthur James Tselepis, Midland, MI (US)

(73) Assignee: Firestone Building Products Company, LLC, Nashville, TN (US)

( * ) Notice: Subject to any disclaimer, the term of this patent is extended or adjusted under 35 U.S.C. 154(b) by 201 days.

(21) Appl. No.: 15/650,519

(22) Filed: Jul. 14, 2017

(65) Prior Publication Data

US 2018/0016791 A1   Jan. 18, 2018

Related U.S. Application Data

(60) Provisional application No. 62/363,052, filed on Jul. 15, 2016.

(51) Int. Cl.
| | |
|---|---|
| *E04D 5/10* | (2006.01) |
| *E04D 5/14* | (2006.01) |
| *D06N 5/00* | (2006.01) |
| *D06N 3/12* | (2006.01) |
| *C09D 183/04* | (2006.01) |
| *C08L 83/04* | (2006.01) |
| *C08G 77/16* | (2006.01) |

(52) U.S. Cl.
CPC .............. *E04D 5/10* (2013.01); *C08L 83/04* (2013.01); *C09D 183/04* (2013.01); *D06N 3/128* (2013.01); *D06N 5/00* (2013.01); *E04D 5/148* (2013.01); *C08G 77/16* (2013.01); *C08J 2383/04* (2013.01); *D06N 2203/066* (2013.01); *D06N 2205/023* (2013.01); *D06N 2211/06* (2013.01)

(58) Field of Classification Search
USPC .......................................................... 156/71
See application file for complete search history.

(56) References Cited

U.S. PATENT DOCUMENTS

| | | | | |
|---|---|---|---|---|
| 3,081,496 A | * | 3/1963 | Moore | B29C 44/583 264/216 |
| 4,221,688 A | | 9/1980 | Johnson et al. | |
| 4,668,315 A | | 5/1987 | Brady et al. | |
| 4,904,434 A | * | 2/1990 | Hyer | B29C 35/06 264/146 |
| 5,994,459 A | | 11/1999 | Berg et al. | |
| 6,218,498 B1 | * | 4/2001 | Oberneder | C07F 7/10 528/34 |
| 2012/0245243 A1 | * | 9/2012 | Lindner | B29C 44/348 521/172 |
| 2014/0349125 A1 | * | 11/2014 | Yang | B01J 31/0251 428/447 |

FOREIGN PATENT DOCUMENTS

WO    2018013945 A1    1/2018

OTHER PUBLICATIONS

International Search Report and Written Opinion dated Oct. 4, 2017 for related PCT/US2017/042171.

* cited by examiner

*Primary Examiner* — Sing P Chan
(74) *Attorney, Agent, or Firm* — Brian D. McAlhaney; Arthur M. Reginelli

(57) ABSTRACT

Silicone membranes and methods of manufacturing membranes are provided.

17 Claims, No Drawings

SILICONE MEMBRANES

CROSS-REFERENCE TO RELATED APPLICATION(S)

This application claims priority to U.S. Provisional Patent Application No. 62/363,052, filed on Jul. 15, 2016, which is incorporated herein by reference in its entirety.

TECHNICAL FIELD

The present disclosure relates generally to silicone membranes, methods for fabricating the membranes, and methods of using the membranes.

BACKGROUND

Current materials used for single ply roof coverings or membranes include ethylene/propylene/butadiene (EPDM) copolymers, polyvinyl chloride (PVC)/plasticizer, and ethylene/propylene copolymer (TPO). Conventional single ply roof coverings or membranes have experienced several problems with longevity, UV degradation, ease of installation, poor light reflectivity resulting in higher energy costs, shrinkage resulting in seam failure, time consuming attachment, replacement and repair procedures, low tolerance of cold temperatures causing cracking and loss of flexibility and lower adhesive resistance to chemical attack. There exists a need for improved membranes and methods of manufacturing membranes.

SUMMARY

In one aspect, disclosed are silicone membranes. In another aspect, disclosed are methods of preparing the silicone membranes. In another aspect, disclosed are methods of using the silicone membranes.

DETAILED DESCRIPTION

Disclosed herein are silicone membranes. The silicone membranes include a substrate and a silicone composition coating at least a portion of the substrate. As used herein, the term "coating" may refer to the silicone composition covering external surfaces and/or internal surfaces of a selected substrate. For example, the substrate may "impregnated" with the silicone composition (e.g., by contacting a porous substrate in an emulsion composition containing a pre-crosslinked polysiloxane, such as by immersing a porous substrate in an emulsion containing a pre-crosslinked polysiloxane).

The membranes can be used for a variety of exterior applications, such as roofing applications. For example, a roll of the silicone membrane may be the top part of a roofing system. Sheets of polyisocyanurate (polyiso) board can be mechanically fastened to a roof pan or to a previous roof, and then covered with a disclosed silicone membrane. The roll of silicone membrane may be unrolled over the polyiso board and overlapped (e.g., about 6 inches of overlap). The silicone membrane rolls may be glued down or mechanically fastened at the edges so the overlap covers the fasteners. An adhesive may then be applied under the overlap to permanently secure and seal the membranes to the polyiso board.

The silicone membranes can be used to extend the roofing season for silicone roofing, whereas current liquid applied systems are generally not applied below freezing temperatures due to cure rate and moisture concerns. The silicone membranes may possess greater longevity compared to known single ply systems. The silicone membranes may maintain flexibility across the full range of seasonal temperatures. Consequently, use of the disclosed silicone membrane can result in lower maintenance or replacement costs over the membranes' lifetime. The silicone membranes may possess a lower carbon footprint by virtue of the availability of silicone material feed-streams. The silicone membranes may be resistant to UV-degradation, oxidation, and ozonolysis. The silicone membranes may be fire retardant without requiring addition of flame retardant additives. The silicone membranes can be provided in various colors, including reflective white, to accommodate the geographic location, sun exposure, and temperatures associated therewith. The membranes can sustain a high level of solar reflectivity relative to conventional roof membranes, thereby providing further savings via reduced energy consumption. The silicone membranes may exhibit self-cleaning properties.

Also disclosed herein are emulsions for preparing silicone membranes. The emulsions may include a hydroxyl-terminated polysiloxane, a crosslinker, and a catalyst. The emulsions may be aqueous-based emulsions. The emulsions may include additional components, such as surfactants, pH-adjusters, pigments, and reinforcing agents. The emulsions may be applied to a selected substrate to coat the substrate with a pre-crosslinked polysiloxane composition. The composition may be cross-linked and the silicone membrane thus formed by a selected curing process. The curing process may include a contacting the coated membrane with an aqueous salt bath (e.g., a salt bath containing calcium or magnesium salts). The salt bath treatment can "salt out" the emulsion and cause rapid coalescence of the silicone emulsion, resulting in a cured silicone composition coating the substrate. One or more steps of the process can be repeated until the desired build-up of silicone has resulted in the desired membrane thickness. The step of contacting the coated membrane with an aqueous salt bath may be conducted by passing the coated membrane through the aqueous salt bath. The membrane can be dried and allowed to post cure. The membrane can be rolled and cut, ready for use in a selected application.

Also disclosed herein are methods for preparing silicone membranes. A method may include mixing a hydroxyl-terminated polysiloxane, a crosslinker, and a catalyst, to provide a first mixture; mixing a surfactant and water to provide a second mixture; and combining and mixing the first and second mixtures to provide an emulsion. Additional components (e.g., surfactants, pH-adjusters, pigments, and reinforcing agents) may be added to the emulsion at various stages of preparation. The emulsion can thereafter be applied to a substrate and subsequently cured. In certain embodiments, the silicone compositions are cured through a salting out process through treatment (e.g., submersion) in an aqueous salt bath.

In certain embodiments, a method of preparing a silicone membrane includes preparing a silicone emulsion, applying the silicone emulsion to a substrate to form an emulsion soaked substrate; contacting the emulsion soaked substrate with an aqueous salt bath to cure the silicone composition and provide a silicone coated substrate; and drying the silicone coated substrate. The emulsion may include a hydroxyl-terminated polysiloxane, a crosslinker, a catalyst, a surfactant, and water; and optionally one or more additional components. The step of contacting the coated membrane with an aqueous salt bath may be conducted by passing the coated membrane through the aqueous salt bath.

The order of addition of components into the emulsion can be varied as necessary to produce a suitable emulsion.

1. DEFINITION OF TERMS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

As used herein, the term "suitable substituent" is intended to mean a chemically acceptable functional group (i.e., a moiety that does not negate the activity of the disclosed compositions). Illustrative examples of suitable substituents include, but are not limited to, halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl group, heteroaryl groups, aryloxy groups, heteroaryloxy groups, aralkyl groups, heteroaralkyl groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups and the like. Those skilled in the art will appreciate that many substituents can be substituted by additional substituents.

As used herein, the term "alkenyl" refers a straight or branched hydrocarbon chain containing from 2 to 10 carbons and containing at least one carbon-carbon double bond formed by the removal of two hydrogens. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, and 3-decenyl. Alkenyl groups may be unsubstituted or substituted by one or more suitable substituents, preferably 1 to 3 suitable substituents, as defined above.

As used herein, the term "alkoxy" refers to an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

As used herein, the term "alkyl" refers to a linear or branched hydrocarbon radical, preferably containing 1 to 10 carbon atoms. The term "$C_1$-$C_6$-alkyl" is defined to include alkyl groups having 1, 2, 3, 4, 5, or 6 carbons in a linear or branched arrangement. For example, "$C_1$-$C_6$-alkyl" specifically includes methyl, ethyl, n-propyl, i-propyl, n-butyl, t-butyl, i-butyl, pentyl, and hexyl. Alkyl groups may be unsubstituted or substituted by one or more suitable substituents, preferably 1 to 3 suitable substituents, as defined above.

As used herein, the term "alkynyl" refers to a straight or branched hydrocarbon radical having 2, 3, 4, 5, 6, 7, 8, 9 or 10 carbons, and having one or more carbon-carbon triple bonds. Alkynyl groups include, but are not limited to, ethynyl, propynyl, and butynyl. Alkynyl groups may be unsubstituted or substituted by one or more suitable substituents, preferably 1 to 3 suitable substituents, as defined above.

As used herein, the term "amino" refers to an —$NH_2$ group.

As used herein, the term "aminoalkyl" refers to at least one amino group, as defined herein, appended to the parent molecular moiety through an alkyl group, as defined herein. Representative examples of aminoalkyl include, but are not limited to, aminomethyl, 2-aminoethyl, and 2-aminopropyl.

As used herein, the term "aryl" means monocyclic, bicyclic, or tricyclic aromatic radicals. Representative examples of the aryl groups include, but are not limited to, phenyl, dihydroindenyl, indenyl, naphthyl, dihydronaphthalenyl, and tetrahydronaphthalenyl. Aryl groups may be optionally substituted by one or more suitable substituents, preferably 1 to 5 suitable substituents, as defined above.

As used herein, the term "carbonyl" or "(C=O)" (as used in phrases such as alkylcarbonyl, alkyl —(C=O)— or alkoxycarbonyl) refers to the joinder of the >C=O moiety to a second moiety such as an alkyl or amino group (i.e. an amido group).

Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

As used herein, the term "cycloalkyl" refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1] heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

As used herein, the term "halogen" or "halo" refers to a fluoro, chloro, bromo or iodo radical.

As used herein, the term "haloalkyl" refers to an alkyl group, as defined herein, substituted by one, two, three, or four halogen atoms. Representative examples of haloalkyl include, but are not limited to, chloromethyl, 2-fluoroethyl, trifluoromethyl, pentafluoroethyl, 2-chloro-3-fluoropentyl, and 4,4,4,-trifluorobutyl.

As used herein, the term "heteroaryl" refers to a monocyclic heteroaryl or a bicyclic heteroaryl. The monocyclic heteroaryl is a five- or six-membered ring. The five-membered ring contains two double bonds. The five-membered ring may contain one heteroatom selected from O or S; or one, two, three, or four nitrogen atoms and optionally one oxygen or sulfur atom. The six-membered ring contains three double bonds and one, two, three or four nitrogen atoms. Representative examples of monocyclic heteroaryl include, but are not limited to, furanyl, imidazolyl, isoxazolyl, isothiazolyl, oxadiazolyl, 1,3-oxazolyl, pyridinyl, pyridazinyl, pyrimidinyl, pyrazinyl, pyrazolyl, pyrrolyl, tetrazolyl, thiadiazolyl, 1,3-thiazolyl, thienyl, triazolyl, and triazinyl. The bicyclic heteroaryl includes a monocyclic heteroaryl fused to a phenyl, or a monocyclic heteroaryl fused to a monocyclic cycloalkyl, or a monocyclic heteroaryl fused to a monocyclic cycloalkenyl, or a monocyclic heteroaryl fused to a monocyclic heteroaryl, or a monocyclic heteroaryl fused to a monocyclic heterocycle. Representative examples of bicyclic heteroaryl groups include, but are not limited to, benzofuranyl, benzothienyl, benzoxazolyl, benzimidazolyl, benzoxadiazolyl, 6,7-dihydro-1,3-benzothiazolyl, imidazo[1,2-a]pyridinyl, indazolyl, indolyl, isoindolyl, isoquinolinyl, naphthyridinyl, pyridoimidazolyl, quinazolinyl, quinolinyl, thiazolo[5,4-b]pyridin-2-yl, thiazolo[5,4-d]pyrimidin-2-yl, and 5,6,7,8-tetrahydroquinolin-5-yl. Heteroaryl groups may be unsubstituted or substituted by one or more suitable substituents, preferably 1 to 5 suitable substituents, as defined above.

As used herein, the term "heterocycle" or "heterocyclyl" refers to a monocyclic heterocycle, a bicyclic heterocycle, or a tricyclic heterocycle. The monocyclic heterocycle is a three-, four-, five-, six-, seven-, or eight-membered ring containing at least one heteroatom independently selected from the group consisting of oxygen, nitrogen, phosphorus and sulfur. The three- or four-membered ring contains zero or one double bond, and one heteroatom selected from the group consisting of oxygen, nitrogen, phosphorus and sulfur. The five-membered ring contains zero or one double bond and one, two or three heteroatoms selected from the group consisting of oxygen, nitrogen, phosphorus and sulfur. The six-membered ring contains zero, one or two double bonds and one, two or three heteroatoms selected from the group consisting of oxygen, nitrogen, phosphorus and sulfur. The seven- and eight-membered rings contains zero, one, two, or three double bonds and one, two, or three heteroatoms selected from the group consisting of oxygen, nitrogen, phosphorus and sulfur. Representative examples of monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, phosphinane, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydropyrimidinyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, or a monocyclic heterocycle fused to a monocyclic heterocycle, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. Representative examples of bicyclic heterocycles include, but are not limited to, benzopyranyl, benzothiopyranyl, chromanyl, 2,3-dihydrobenzofuranyl, 2,3-dihydrobenzothienyl, azabicyclo[2.2.1]heptyl (including 2-azabicyclo[2.2.1]hept-2-yl), 2,3-dihydro-1H-indolyl, isoindolinyl, octahydrocyclopenta[c]pyrrolyl, octahydropyrrolopyridinyl, 9-phosphabicyclo[3.3.1]nonane, 8-phosphabicyclo[3.2.1]octane, and tetrahydroisoquinolinyl. Tricyclic heterocycles are exemplified by a bicyclic heterocycle fused to a phenyl group, or a bicyclic heterocycle fused to a monocyclic cycloalkyl, or a bicyclic heterocycle fused to a monocyclic cycloalkenyl, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but are not limited to, octahydro-2,5-epoxypentalene, hexahydro-2H-2,5-methanocyclopenta[b]furan, hexahydro-1H-1,4-methanocyclopenta[c]furan, aza-admantane (1-azatricyclo[3.3.1.1$^{3,7}$]decane), oxa-adamantane (2-oxatricyclo[3.3.1.1$^{3,7}$]decane), and 2,4,6-trioxa-8-phosphatricyclo[3.3.1.13,7] decane. Heterocyclic groups may be unsubstituted or substituted by one or more suitable substituents, preferably 1 to 3 suitable substituents, as defined above.

As used herein, the term "hydroxy" refers to an —OH group.

As used herein, the term "hydroxyalkyl" refers to an alkyl group, as defined herein, substituted by at least one hydroxy group. Representative examples of hydroxyalkyl include, but are not limited to, hydroxymethyl, 2-hydroxyethyl, 3-hydroxypropyl, 2,3-dihydroxypropyl, 2,3-dihydroxypentyl, 4-hydroxybutyl, 2-ethyl-4-hydroxyheptyl, 3,4-dihydroxybutyl, and 5-hydroxypentyl.

A prefix attached to a multi-component substituent only applies to the first component it precedes. To illustrate, the term "alkylcycloalkyl" contains two components: alkyl and cycloalkyl. Thus, the $C_1$-$C_6$-prefix on $C_1$-$C_6$-alkylcycloalkyl means that the alkyl component of the alkylcycloalkyl contains from 1 to 6 carbon atoms; the $C_1$-$C_6$-prefix does not describe the cycloalkyl component. To illustrate further, the prefix "halo" on haloalkoxyalkyl indicates that only the alkoxy component of the alkoxyalkyl substituent is substituted with one or more halogen radicals. If the halogen substitution may only occur on the alkyl component, the substituent would instead be described as "alkoxyhaloalkyl."

A substituent is "substitutable" if it comprises at least one carbon or nitrogen atom that is bonded to one or more hydrogen atoms. Thus, for example, hydrogen, halogen, and cyano do not fall within this definition. In addition, a sulfur atom in a heterocyclyl containing such atom is substitutable with one or two oxo substituents.

If a substituent is described as being "substituted", a non-hydrogen radical is in the place of hydrogen radical on a carbon or nitrogen of the substituent. Thus, for example, a substituted alkyl substituent is an alkyl substituent in which at least one non-hydrogen radical is in the place of a hydrogen radical on the alkyl substituent. To illustrate, monofluoroalkyl is alkyl substituted with a fluoro radical, and difluoroalkyl is alkyl substituted with two fluoro radicals. It should be recognized that if there is more than one substitution on a substituent, each non-hydrogen radical may be identical or different (unless otherwise stated).

When a substituent is referred to as "unsubstituted" or not referred to as "substituted" or "optionally substituted", it means that the substituent does not have any substituents. If a substituent is described as being "optionally substituted", the substituent may be either (1) not substituted or (2) substituted. If a substituent is described as being optionally substituted with up to a particular number of non-hydrogen radicals, that substituent may be either (1) not substituted; or (2) substituted by up to that particular number of non-hydrogen radicals or by up to the maximum number of substitutable positions on the substituent, whichever is less. Thus, for example, if a substituent is described as a heteroaryl optionally substituted with up to 3 non-hydrogen radicals, then any heteroaryl with less than 3 substitutable positions would be optionally substituted by up to only as many non-hydrogen radicals as the heteroaryl has substitutable positions. To illustrate, tetrazolyl (which has only one substitutable position) would be optionally substituted with up to one non-hydrogen radical. To illustrate further, if an amino nitrogen is described as being optionally substituted with up to 2 non-hydrogen radicals, then a primary amino nitrogen will be optionally substituted with up to 2 non-hydrogen radicals, whereas a secondary amino nitrogen will be optionally substituted with up to only 1 non-hydrogen radical.

If substituents are described as being "independently selected" from a group, each substituent is selected independent of the other. Each substituent, therefore, may be identical to or different from the other substituent(s).

As used herein, the term "wt % based on binder solids" or "wt % based on resin solids" refers to weight of the material per weight of solid material in the formulation minus fillers, pigments and non-film formers. Pigments are typically solids materials that add color and cannot be dissolved in standard solvents. Examples of pigments are titanium dioxide, red iron oxide, phthalocyanine blue. Fillers typically impart little or no color to a film and generally function as solids to impart economics, chemical resistance, corrosion resistance, and rheology. Examples of fillers are talc, clay, silica, and calcium carbonate. Binder solids may refer to resin solids. In certain embodiments, "wt % based on binder solids" may refer to wt % based on polysiloxane resin content. In certain embodiments, "wt % based on binder solids" may refer to wt % based on polydimethylsiloxane resin content.

As used herein, the term "exterior environment" may refer to an environment characterized by a tropical/megathermal climate, a dry (arid and semiarid) climate, a temperate/ mesothermal climate, a continental/microthermal climate, or a polar or alpine climate. Such climates are delineated in the Koppen climate classification system.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. SILICONE MEMBRANES

Disclosed are silicone membranes. The membranes include a substrate and a silicone composition coating at least a portion of the substrate. The membranes may have a thickness of 20 mils to 150 mils, or 30 mils to 125 mils. The finished membranes may be cut to any dimensions as suitable for their intended use or customer.

a. Substrates

The disclosed membranes include at least one substrate. The substrate may be a mesh or fabric (e.g., polyester fabric). Suitable substrate materials include, but are not limited to, a woven fabric, a nonwoven fabric, a knit, a fibrous support (e.g., glass, silica, metals, ceramic, silicon carbide, carbon, boron, basalt), synthetic fibers (e.g., polyesters, polyamides, polyacrylics, chlorofibres, polyolefins, synthetic rubbers, polyvinyl alcohol, aramides, "fluorofibres", phenolics, and the like).

b. Silicone Compositions

The disclosed membranes include at least one silicone composition. The silicone composition may include a cross-linked polysiloxane. The silicone composition may optionally include one or more of a catalyst, a surfactant, a pH-adjuster, a filler, or a pigment. The silicone composition may be derived from an aqueous emulsion comprising a pre-crosslinked polysiloxane, and optionally include one or more additional components.

i. Polysiloxane Component

The polysiloxane component of the silicone composition may be a hydroxy-terminated polysiloxane. The compositions can include a combination of polysiloxanes. The polysiloxane component will undergo one or more cross-linking reactions to provide a cured silicone composition.

In certain embodiments, the polysiloxane component has formula:

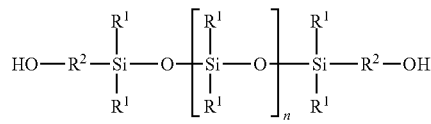

wherein $R^1$ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl;

$R^2$ at each occurrence is independently selected from alkyl, aryl, arylalkyl and a bond; and n ranges from 10 to 1,000, or from 160-250, wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents.

In certain embodiments, $R^1$ at each occurrence is independently selected from alkyl, alkenyl, aryl, and arylalkyl, wherein said alkyl, alkenyl, aryl, and arylalkyl are each independently, at each occurrence, unsubstituted or substituted with one or more suitable substituents. In certain embodiments, $R^1$ is methyl at each occurrence. In certain embodiments, $R^2$ is a bond at each occurrence. In certain embodiments, $R^1$ is methyl at each occurrence and $R^2$ is a bond at each occurrence.

In certain embodiments, the polysiloxane component is a hydroxy-terminated polydimethylsiloxane having formula:

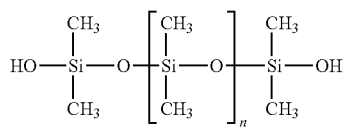

In certain embodiments, the polysiloxane component is a hydroxy-terminated polydimethylsiloxane resin having a weight average molecular weight of 1,000 g/mol to 100,000 g/mol, 3,000 g/mol to 100,000 g/mol, or 14,000 g/mol to 42,000 g/mol, and a viscosity of 70 centistoke to 100,000 centistoke or 750 centistoke to 20,000 centistoke.

Exemplary hydroxyl-terminated components include, but are not limited to, Andisil® OH Polymers (e.g., Andisil® OH 750 Silanol terminated 750 cps; Andisil® OH 1,000 Silanol terminated 1,000 cps; Andisil® OH 2,000 Silanol terminated 2,000 cps; Andisil® OH 3,500 Silanol terminated 3,500 cps; Andisil® OH 4,000 Silanol terminated 4,000 cps; Andisil® OH 6,000 Silanol terminated 6,000 cps; Andisil® OH 14,000 Silanol terminated 14,000 cps; Andisil® OH 20,000 Silanol terminated 20,000 cps; Andisil® OH 50,000 Silanol terminated 50,000 cps; Andisil® OH 80,000 Silanol terminated 80,000 cps; and Andisil® OH 300,000 Silanol terminated 300,000 cps).

The polysiloxane content of the disclosed compositions may range from 35 wt % to 65 wt %, from 40 wt % to 60 wt %, or from 45 wt % to 55 wt %, based on total weight of the composition. In certain embodiments, the polysiloxane content of the disclosed composition is about 35 wt %, about 40 wt %, about 45 wt %, about 50 wt %, about 55 wt %, about 60 wt %, or about 65 wt %, based on total weight of the composition.

The polysiloxane content of the disclosed compositions may range from 60 wt % to 100 wt %, 80 wt % to 95 wt %, or from 85 wt % to 90 wt %, based on binder solids. In certain embodiments, the polysiloxane content of the disclosed composition is about 60 wt %, about 65 wt %, about 70 wt %, about 75 wt %, about 80 wt %, about 85 wt %, about 90 wt %, about 95 wt %, or about 100 wt %, based on binder solids.

ii. Crosslinkers

The disclosed compositions can include one or more crosslinker components. Suitable crosslinkers include, but are not limited to, organosilanes containing at least 3 hydrolyzable groups in one molecule and/or its partial hydrolysate. Exemplary hydrolyzable groups in such organosilanes or its partial hydrolysate include a ketoxime group, an alkoxy group, an acetoxy group, and an isopropenoxy group. Suitable crosslinking agents include, but are not limited to, ketoxime silanes such as tetrakis(methylethylketoxime)silane, methyltris(dimethylketoxime)silane, methyltris(methylethylketoxime)silane, ethyltris(methylethylketoxime)silane, methyltris(methyl isobutyl ketoxime)silane, and vinyl tris(methylethylketoxime)silane; alkoxysilanes such as methyltrimethoxysilane, vinyltrimethoxysilane, phenyltrimethoxysilane, and vinyltriethoxy silane; acetoxysilanes such as methyltriacetoxysilane and vinyltriacetoxysilane; isopropenoxy silanes such as methyltriisopropenoxysilane, vinyltriisopropenoxysilane, and phenyltriisopropenoxysilane; and a partial hydrolysate/condensate of such silanes. In certain embodiments, the crosslinker is tris(methylethylketoxime)methylsilane (also referred to as methyltris(methylethylketoxime)silane). In certain embodiments, the crosslinker is trimethoxysilane or aminopropyltrimethoxysilane.

In certain embodiments, the crosslinker may be an aminoxy functional silicone, such as that disclosed in U.S. Pat. No. 4,360,631, which is incorporated herein by reference. Such a crosslinker may be prepared by adding diethylhydroxyamine to a siloxane having the following formula:

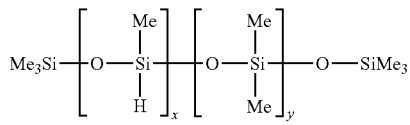

wherein x is 3, 4, or 5, and y is 2, 3, or 4. Such reaction produces a product having the following formula:

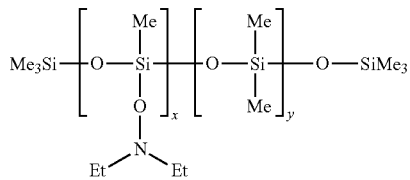

wherein x and y have the same values as shown above. An advantage of this crosslinker is that a catalyst such as a tin catalyst may not be required, and the amount of other components such as a pH adjuster may be reduced.

The crosslinker content of the disclosed compositions may range from 0 wt % to 15 wt %, from 1 wt % to 10 wt %, or from 1 wt % to 3 wt %. In certain embodiments, the crosslinker content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, based on total weight of the composition.

The crosslinker content of the disclosed compositions may range from 0 wt % to 20 wt %, from 1 wt % to 15 wt %, or from 5 wt % to 12 wt %, based on binder solids. In certain embodiments, the crosslinker content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on binder solids.

iii. Catalysts

The disclosed compositions can include one or more catalysts. Suitable catalysts include, but are not limited to, organo tin catalysts such as dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dimethyltin diacetate, dioctyltin dioctate, dioctyltin dilaurate, tin dioctate, and tin laulate; and organotitanium catalysts such as tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate. In certain embodiments, the catalyst is dimethyldineodecanoatetin.

The catalyst content of the disclosed compositions may range from 0 wt % to 3 wt %, or 0.1 wt % to 1 wt %, based on total weight of the composition. In certain embodiments, the catalyst content of the disclosed compositions is 1 wt % or less, 0.5 wt % or less, 0.1 wt % or less, 0.05 wt % or less, about 1 wt %, about 0.5 wt %, about 0.1 wt %, or about 0.05 wt %, based on total weight of the composition.

The catalyst content of the disclosed compositions may range from 0 wt % to 3 wt %, or 0.1 wt % to 1 wt %, based on binder solids. In certain embodiments, the catalyst content of the disclosed compositions is 1 wt % or less, 0.5 wt % or less, 0.1 wt % or less, 0.05 wt % or less, about 1 wt %, about 0.5 wt %, about 0.1 wt %, or about 0.05 wt %, based on binder solids.

iv. Surfactants

The disclosed compositions can include one or more surfactants. Suitable surfactants include, but are not limited to, ethoxylated long chain alcohols (e.g., branched secondary alcohol ethoxylates), an ethoxylated 3-hydroxypropyl-heptamethyltrisiloxane, an ethoxylated silicone polyether, a polyalkyleneoxide modified heptamethyltrisiloxane, a polydimethylsiloxane, a polyalkyleneoxide polysiloxane, and any combination thereof. Suitable commercially available silicone surfactants may include, but are not limited to Dynol® 960 and Dynol® 980, available from Air Products and Chemicals, Inc. in Allentown, Pa. and Dow Corning® 67, Dow Corning® 500W, Dow Corning® 501W, Dow Corning® 502W (available from Dow Corning in Midland, Mich.), Tergitol™ TMN-6 (90%) Surfactant (available from Dow), and Tergitol™ TMN-10 (90%) Surfactant. Combinations of these commercially available silicone surfactants may also be suitable for use in the embodiments described herein. In certain embodiments, the surfactant is 3-(polyoxyethylene)propylheptamethyltrisiloxane. (i.e., Dow Corning® 502W Additive or Dow Corning® 67 Additive)

The surfactant content of the disclosed compositions may range from 0 wt % to 15 wt %, from 1 wt % to 10 wt %, or from 1 wt % to 3 wt %. In certain embodiments, the surfactant content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, based on total weight of the composition.

v. Solvents

The disclosed compositions can include one or more solvents. Suitable solvents include, but are not limited to, water, mineral spirits, toluene, hexane, xylene, or combinations thereof. In certain embodiments, the compositions are solvent-free. In certain embodiments, the compositions include water (e.g., deionized water). In certain embodiments, an emulsion as disclosed herein is diluted to about 50% solids with water.

The solvent content of the disclosed compositions may range from 0 wt % to 50 wt %, or from 0 wt % to 20 wt %, based on total weight of the composition. In certain embodiments, the solvent content of the disclosed compositions is 0 wt %, about 5 wt %, about 10 wt %, about 15 wt %, about 20 wt %, about 25 wt %, about 30 wt %, about 35 wt %, about 40 wt %, about 45 wt %, or about 50 wt %, based on total weight of the composition.

vi. pH-Adjusters

The disclosed compositions can include one or more pH-adjusters. A pH adjuster may be basic or acidic, and may increase or decrease the pH of the composition. Suitable pH-adjuster include, but are not limited to, basic such as sodium hydroxide, 2-amino-2-methyl-1-propanol, ammonia, and the like. Acidic compounds that can serve as pH adjusters include phosphoric acid, hydrochloric acid, acetic acid, and citric acid. A pH adjuster optionally may be present in an amount of about 0.01% to about 20% by weight, based on the total weight of the composition.

vii. Fillers

The disclosed compositions can include one or more filler components. Suitable fillers include, but are not limited to, calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, diatomaceous earth, calcium silicate, aluminum silicate, titanium dioxide, aluminum oxide, zinc oxide, ferrite, iron oxide, carbon black, graphite, mica, clay, and bentonite. In certain embodiments, the filler is colloidal silica, such as that sold under the tradename Nalco® 1115.

The filler content of the disclosed compositions may range from 0 wt % to 20 wt %, from 0.5 wt % to 15 wt %, or from 3 wt % to 8 wt %, based on total weight of the composition. In certain embodiments, the filler content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on total weight of the composition.

The filler content of the disclosed compositions may range from 0 wt % to 20 wt %, from 0.5 wt % to 15 wt %, or from 3 wt % to 8 wt %, based on polymer content. In certain embodiments, the filler content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on polymer content.

viii. Pigments

The disclosed compositions can include one or more pigments (e.g., organic or inorganic pigments). The pigments may be UV absorbing, IR absorbing, UV reflective, or IR reflective. Pigment selection may allow the membrane to be UV opaque. Pigment selection may allow the membrane to be IR reflective. Pigment selection may be made to reduce heat infiltration and provide energy savings. Pigment selection may be made to allow heat infiltration and provide energy savings. Thus, pigment selection may be made to account for geographic location and climate. Suitable pigments include, but are not limited to, zinc oxide, antimony oxide, zirconium oxide, chromium oxide, iron oxide, lead oxide, zinc sulfide, titanium dioxide (anatase, rutile, or brookite), lithopone, and carbon black. In certain embodiments, the pigment is titanium dioxide.

The pigment content of the disclosed compositions may range from 0 wt % to 15 wt %, from 1 wt % to 12 wt %, from 3 wt % to 10 wt %, from 5 wt % to 8 wt %, based on total weight of the composition. In certain embodiments, the pigment content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, based on total weight of the composition.

The pigment content of the disclosed compositions may range from 0 wt % to 30 wt %, from 0 wt % to 20 wt %, from 1 wt % to 18 wt %, from 3 wt % to 15 wt %, from 8 wt % to 12 wt %, based on binder solids. In certain embodiments, the pigment content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on binder solids.

ix. UV-Absorbers

The disclosed compositions can include one or more ultraviolet absorbers (also referred to as a UV-absorber or UVA). Suitable ultraviolet absorbers include, but are not limited to, aromatic propanedione UV absorbers (e.g., 4-t-Butyl-4'-methoxydibenzoylmethane or avobenzone, GIVSORB UV-14; and mixtures thereof); benzimidazole UV absorbers (e.g., 2-Phenyl-1H-benzimidazole-5-sulfonic acid, GIVSORB UV-16; and mixtures thereof); benzophenone UV absorbers (e.g., 2-Hydroxy-4-n-octyloxybenzophenone, UVINUL 3008; 2-Hydroxy-4-methoxybenzophenone, UVINUL 3040; 2-Hydroxy-4-methoxy-5-sulfobenzophenone or Sulisobenzone, UVINUL MS 40; 2-(4-Benzoyl-3-hydroxyphenoxy)-2-propenoic acid ethyl ester, CYASORB UV 2098; Homopolymer of 4-(2-Acryloyloxyethoxy)-2-hydroxybenzophenone, CYASORB UV 2126; 2,2'-Dihydroxy-4-methoxybenzophenone or Dioxybenzone, CYASORB UV 24; 2-Hydroxy-4-(2-hydroxy-3-decyloxypropoxy)benzophenone and 2-Hydroxy-4-(2-hydroxy-3-octyloxypropoxy)benzophenone, MARK 1535; 2,4,4'-Trihydroxybenzophenone, MAXGARD 200; 2-Hydroxy-4-(isooctyloxy)benzophenone, MAXGARD 800; 2-Hydroxy-4-dodecyloxybenzophenone, UVINUL 410; 2,2'-Dihydroxy-4,4'-dimethoxy-5,5'-disulfobenzophenone, disodium salt, UVINUL 3048; 2,4-Dihydroxybenzophenone or 4-Benzoylresorcinol, UVINUL 400; 2,2'-Dihydroxy-4,4'-dimethoxybenzophenone, UVINUL D 49; 2,2',4,4'-Tetrahydroxybenzophenone, UVINUL D 50; 2,2'-Dihydroxy-4-(2-hydroxyethoxy)benzophenone, UVINUL X-19; 2-Hydroxy-4benzyloxybenzophenone, Seesorb 105; and mixtures thereof); benzopyranone UV absorbers (e.g., 3,3',4',5,7-pentahydroxyflavone or quercetin; and mixtures thereof); benzotriazole UV absorbers (e.g., 2-[2-hydroxy-5-(1,1,3,3-tetramethylbutyl)phenyl]benzotriazole, TINUVIN 329; 2-(2'-hydroxy-5'-(2-hydroxyethyl))benzotriazole, NORBLOC 6000; 2-(2'-hydroxy-5'-methacrylyloxyethylphenyl)-2H-benzotriazole, NORBLOC 7966; 1,1,1-tris(hydroxyphenyl)ethane benzotriazole, THPE BZT; 5-t-butyl-3-(5-chloro-2H-benzotriazol-2-yl)-4-hydroxybenzenepropanoic acid octyl ester and 3-(5-chloro-2H-benzotriazol-2-yl)-5-t-butyl-4-hydroxybenzenepropanoic acid octyl ester, TINUVIN 109; a-[3-[3-(2H-benzotriazol-2-yl)-5-t-butyl-4-hydroxyphenyl]-1-oxopropyl]-w-hydroxypoly(oxy-1,2-ethanediyl) and a-[3-[3-(2H-benzotriazol-2-yl)-5-t-butyl-4-hydroxyphenyl]-1-oxopropyl]-w-[3-[3-(2H-benzotriazol-2-yl)-5-t-butyl-4-hydroxyphenyl]-1-oxopropoxy]poly(oxy-1,2-ethanediyl), TINUVIN 1130; 2-(2-Hydroxy-3,5-di-t-butylphenyl)benzotriazole, TINUVIN 320; 2-(2-hydroxy-3-t-butyl-5-methylphenyl)-5-chloro-2H-benzotriazole, TINUVIN 326; 2-(3'-5'-di-t-butyl-2'-hydroxyphenyl)-5-chlorobenzotriazole, TINUVIN 327; 2-(2-Hydroxy-3,5-di-t-amylphenyl)benzotriazole, TINUVIN 328; 3-(2H-Benzotriazol-2-yl)-5-t-butyl-4-hydroxybenzenepropanoic acid, TINUVIN 384; 2-(2H-benzotriazol-2-yl)-4-methyl-6-dodecylphenol, TINUVIN 571; 3-(2H-benzotriazol-2-yl)-5-t-butyl-4-hydroxy-1,6-hexanediyl ester of benzenepropanoic acid and 3-(2H-benzotriazol-2-yl)-5-t-butyl-4-hydroxymethyl ester of benzenepropanoic acid, TINUVIN 840; 2-[2-hydroxy-3,5-bis-(1,1-dimethylbenzyl)phenyl]-2H-benzotriazole, TINUVIN 900; 2-(2H-benzotriazol-2-yl)-6-(1-methyl-1-phenylethyl)-4-(1,1,3,3-tetramethylbutyl)phenol, TINUVIN 928; 3-(2H-benzotriazol-2-yl)-5-t-butyl-4-hydroxybenzenepropanoic acid, C7-9 branched and linear alkyl esters, TINUVIN 99; 2-(2-hydroxy-5-methylphenyl) benzotriazole, TINUVIN P; 2-(2'-hydroxy-3'-sec-butyl-5'-t-butylphenyl)benzotriazole, TINUVIN 350; 2-(2'-hydroxy-5'-t-butylphenyl)benzotriazole, TINUVIN PS; bis[2-hydroxy-3-(2H-benzotriazol-2-yl)-5-octylphenyl]methane, TINUVIN 360; and mixtures thereof); benzoate UV absorbers (e.g., hexadecyl 3,5-di-t-butyl-4-hydroxybenzoate, CYASORB UV 2908; 3-hydroxyphenylbenzoate, SEESORB 300; ethyl-4-[[(ethylphenylamino)methylene]amino] benzoate, GIVSORB UV-1; Phenyl 2-hydroxybenzoate or phenylsalicylate, SEESORB 201; 2,4-di-t-butylphenyl-3,5-di-t-butyl-4-hydroxybenzoate, TINUVIN 120; 4-Bis(polyethoxy)amino acid polyethoxy ethyl ester, UVINUL P 25; 4-t-Butylphenyl 2-hydroxybenzoate or 4-t-butylphenylsalicylate, Seesorb 202; and mixtures thereof); benzoxazinone UV absorbers (e.g., 2,2'-(p-phenylene)di-3,1-benzoxazin-4-one, CYASORB 3638; and mixtures thereof); cinnamates or propenoate UV absorbers (e.g., dimethyl(p-methoxybenzylidene)malonate, SANDUVOR PR 25; 3-(4-methoxyphenyl)-2-propenoic acid 2-ethylhexyl ester or octyl p-methoxycinnamate, UVINUL 3039; and mixtures thereof); cyanoacrylate UV absorbers (e.g., ethyl-2-cyano-3,3-diphenylacrylate, UVINUL 3035; 2-ethylhexyl-2-cyano-3,3-diphenylacrylate, UVINUL 3039; 1,3-bis-[(2'-cyano-3,3'-diphenylacryloyl)oxy]-2,2-bis-{[(2-cyano-3,3-diphenylacryloyl)oxy]methyl}propane, UVINUL 3030; 2-Cyano-3-(2-methylindolinyl)methylacrylate, UV Absorber Bayer 340; and mixtures thereof); cycloaliphatic ketone UV absorbers (e.g., 3-(4-methylbenzylidene)-D,L-camphor, GIVSORB UV-15; and mixtures thereof); formamidine UV absorbers (e.g., Ethyl-4-[[(methylphenylamino)methylene]amino]benzoate, GIVSORB UV-2; and mixtures thereof); formanilide (including oxamide) UV absorbers (e.g., N-(2-ethoxyphenyl)-N'-(4-isododecylphenyl)oxamide, SANDUVOR 3206; N-[5-t-Butyl-2-ethoxyphenyl)-N'-(2-ethylphenyl)oxamide, TINUVIN 315; N-(2-ethoxyphenyl)-N'-(2-ethylphenyl)oxamide, TINUVIN 312; 2H-benzimidazole-2-carboxylic acid (4-ethoxyphenyl) amide, UVINUL FK 4105; and mixtures thereof); triazine UV absorbers (e.g., 2-[4,6-bis(2,4-dimethylphenyl)-1,3,5-triazin-2-yl]-5-octyloxyphenol, CYASORB UV 1164; confidential triazine derivative, TINUVIN 1545; 2-(4,6-diphenyl-1,3,5-triazin-2-yl)-5-hexyloxyphenol, TINUVIN 1577 FF; 2-[4-((2-Hydroxy-3-dodecyloxypropyl)oxy)-2-hydroxyphenyl]-4,6-bis(2,4-dimethylphenyl)-1,3,5-triazine, TINUVIN 400; 2,4,6-Trianilino-p-(carbo-2'-ethylhexyl-1'-oxy)-1,3,5-triazine, UVINUL T-150; and mixtures thereof); and salicylate UV absorbers (e.g., 3,3,5-trimethylcyclohexylsalicylate or homomenthyl salicylate, NEO HELIOPAN HMS; menthyl-o-aminobenzoate, NEO HELIOPAN MA; and mixtures thereof);

The UV-absorber content of the disclosed compositions may range from 0.1 wt % to 15 wt %, from 0.5 wt % to 10 wt %, from 1 wt % to 5 wt %, or from 1.5 wt % to 3 wt %, based on total weight of the composition. In certain embodiments, the UV-absorber content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, based on total weight of the composition.

The UV-absorber content of the disclosed compositions may range from 0.1 wt % to 20 wt %, from 0.1 wt % to 15 wt %, from 0.5 wt % to 10 wt %, from 1 wt % to 5 wt %, or from 1.5 wt % to 3 wt %, based on binder solids. In certain embodiments, the UV-absorber content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on binder solids.

x. Adhesion Promoters

The disclosed compositions can include one or more adhesion promoters, alone or in combination, also referred to as silane coupling agents. Suitable adhesion promoters include those having an alkoxysilyl, a ketoximesilyl, or an alkenoxysilyl group as the hydrolyzable group, and exemplary such compositions include vinyltris(2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris (methylethylketoxime)silane, 3-glycidoxy propyltriisopropenoxysilane, and 3-glycidoxypropylmethyldiisopropenoxysilane. In certain embodiments, the adhesion promoter is 3-aminopropyltriethoxysilane.

The adhesion promoter content of the disclosed compositions may range from 0 wt % to 5 wt %, from 0.5 wt % to 3 wt %, based on total weight of the composition. In certain embodiments, the adhesion promoter content of the disclosed compositions is about 0.5 wt %, about 1.0 wt %, about 1.5 wt %, about 2.0 wt %, about 2.5 wt %, or about 3.0 wt %, based on total weight of the composition.

The adhesion promoter content of the disclosed compositions may range from 0 wt % to 5 wt %, from 0.5 wt % to 3 wt %, based on binder solids. In certain embodiments, the adhesion promoter content of the disclosed compositions is about 0.5 wt %, about 1.0 wt %, about 1.5 wt %, about 2.0 wt %, about 2.5 wt %, about 3.0 wt %, about 3.5 wt %, about 4.0 wt %, about 4.5 wt %, or about 5.0 wt %, based on binder solids.

xi. Additives

The disclosed compositions can include one or more additives. Exemplary additives include, but are not limited to, reinforcing fibers, wetting agents, dispersants, thickeners (rheology modifiers), plasticizers, catalysts, driers, biocides, photoinitiators, processing aids, antioxidants, ageing inhibitors, buffers, and antimicrobials.

The additive content of the disclosed compositions may range from 0 wt % to 60 wt %, based on total weight of the composition. The additive content of the disclosed compositions may range from 0 wt % to 80 wt %, based on binder solids.

3. PROPERTIES OF SILICONE MEMBRANES

The disclosed compositions can have a combination of desired properties. The compositions can have improved functional properties (e.g., dirt pick-up resistance, cleanability, color performance, reflective properties, mechanical properties) or aesthetic properties, or any combination thereof.

a. Tensile Strength

The disclosed compositions may have a tensile strength of 100 psi to 2,000 psi, 100 psi to 400 psi, or 200 psi to 400 psi, as measured according to ASTM D412. The disclosed compositions may have a tensile strength of about 100 psi, about 150 psi, about 200 psi, about 250 psi, about 300 psi, about 350 psi, about 400 psi, about 450 psi, or about 500 psi, as measured according to ASTM D412.

b. Elongation at Break

The disclosed compositions may have an elongation at break of 50% to 400% or 50% to 200%, as measured according to ASTM D412. The disclosed compositions may have an elongation at break of 50% or greater, 100% or greater, 150% or greater, 200% or greater, 250% or greater, 300% or greater, 350% or greater, or 400% or greater, as measured according to ASTM D412.

c. Reflectivity

Reflectivity can be measured using a StellarNet Miniature Spectrometer, for example.

The disclosed compositions may have a reflectivity of 13% or greater, 14% or greater, 15% or greater, 16% or greater, 17% or greater, 18% or greater, 19% or greater, 20% or greater, 21% or greater, 22% or greater, 23% or greater, 24% or greater, 25% or greater, 26% or greater, 27% or greater, or 28% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 380 nanometers.

The disclosed compositions may have a reflectivity of 75% or greater, 76% or greater, 77% or greater, 78% or greater, 79% or greater, 80% or greater, 81% or greater, 82% or greater, 83% or greater, 84% or greater, 85% or greater, 86% or greater, 87% or greater, 88% or greater, 89% or greater, or 90% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 500 nanometers. The disclosed compositions may have a reflectivity of 80% or greater, 81% or greater, 82% or greater, 83% or greater, 84% or greater, 85% or greater, 86% or greater, 87% or greater, 88% or greater, 89% or greater, 90% or greater, 91% or greater, 92% or greater, 93% or greater, 94% or greater, or 95% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 650 nanometers.

4. METHODS OF MAKING SILICONE MEMBRANES

The disclosed silicone compositions and emulsions can be applied to any selected substrate. For example, the disclosed compositions and emulsions can be applied to an organic, inorganic, or composite substrate, such as synthetic and natural polymers, wood, metals, glass, mineral substrates such as concrete, plaster, bricks, stones, and ceramics. The compositions can be applied to a wide variety of weathered and unweathered roofing substrates, such as, for example, asphaltic coatings, roofing felts, synthetic polymer membranes, foamed polyurethane (e.g., spray polyurethane foam), metals (e.g., aluminum), modified bitumen membranes; or to previously painted, primed, undercoated, worn, or weathered substrates, such as metal roofs weathered thermoplastic polyolefin, weathered poly(vinyl chloride), weathered silicone rubber, and weathered ethylene propylene diene monomer rubber.

In certain embodiments, substrates can be prepared for application of the silicone compositions and emulsions by cleaning or treatment by physical abrasion, flame ionization, powerwashing with water, applying an aqueous cleaning solution, such as, for example, from 5 wt % to 10 wt % trisodium phosphate, or other cleaning agents, followed by powerwashing with water, or plasma treatment prior to coating. In certain embodiments, no substrate pre-treatment is performed.

The disclosed compositions can be applied by brushing, spraying, squeegee, pouring, draw down, spin coating, dipping, soaking, applying with a roller or curtain coater, the like, and any combination thereof. The compositions can be adjusted to the consistency suitable for use by heating or by inclusion of one or more solvents (e.g., water). The thicknesses of membranes will depend upon the specific requirements of the application and the desired level of membrane thickness. In certain embodiments, the membrane thickness is 20 mils to 150 mils, or 30 mils to 125 mils.

One exemplary method for preparing a silicone membrane includes preparation of an emulsion useful for the manufacture of silicone membranes. The emulsion may be prepared by mixing a hydroxyl-terminated polysiloxane, a crosslinker, and a catalyst, to provide a first mixture. A surfactant and water may be mixed to provide a second mixture. The first and second mixtures may be mixed until uniform mixtures are obtained. The first mixture and the second mixture may be combined and mixed to provide an emulsion. The first and second mixtures may be agitated and mixed until a transparent gel (e.g., a high solids (≥90%) transparent gel structure) is obtained. Additional water may be added to dilute the emulsion (e.g., to about 50% solids). Optionally, a pH-adjuster (e.g., 2-amino-2-methyl-1-propanol, sold as AMP-95® available from Angus Chemical Company) may be added to adjust the pH (e.g., to greater than 9.5). The emulsion can optionally be reinforced with a filler (e.g., colloidal silica, such as Nalco® 1115). The emulsion may be pigmented with one or more pigments (e.g., titanium dioxide, such as $TiO_2$ pre-dispersed in an anionic surfactant and water).

To prepare the silicone membrane, a selected substrate may be impregnated with the emulsion including the pre-crosslinked polysiloxane. This may be accomplished by applying a silicone emulsion to a substrate to form an emulsion soaked substrate. The silicone composition may be cured by contacting the emulsion soaked substrate with an aqueous salt bath to cure the silicone composition and provide a silicone coated substrate. One exemplary salt bath is an aqueous calcium chloride solution (e.g., a 20 wt % calcium chloride solution). The cured substrate can be dried and processed accordingly for customer use (e.g., the membrane can be rolled and cut to a selected size and shape). The membranes can be dried at ambient temperature and humidity or at elevated temperature and ambient humidity. Excess water can be removed, for example, using dewatering rolls, heat (such as IR heat), or a combination thereof.

5. METHODS OF USING SILICONE MEMBRANES

The disclosed membranes can be used in a variety of exterior applications. In certain embodiments, the membrane is used as a roofing membrane. As the sheet is unrolled over the roof substructure in an otherwise conventional fashion, the seams of adjacent sheet layers are overlapped.

The silicone membranes can be applied to a roof surface by using standard adhesive techniques. For example, the membrane can be unrolled on a roof surface and placed into position. Portions of the membrane are then typically folded back and portions of the release liner are removed. The membrane can then subsequently be adhered to the roof surface by using various techniques including the use of rollers and the like to mate the adhesive to the roof.

Additionally, where multiple membrane panels are employed, the membrane panels can be seamed to one another by over lapping the edges of the panels and fastening the edges of the panels so that the overlap covers a fastener. In certain embodiments, the top surface of the adjoining membrane can be primed prior to seaming the membranes to one another. The overlapping areas may be adhesively seamed to seal and secure the membranes. The width of the seam can vary depending on the requirements specified by the architect, building contractor or roofing contractor.

6. KITS

Disclosed are kits for conveniently and effectively implementing the using the disclosed compositions. Such kits may include one or more components of the disclosed compositions together or in separate vessels, and optionally one or more of instructions, packaging, and dispensers. Kit components may be packaged for either manual or partially or wholly automated practice of the foregoing methods.

7. EXAMPLES

The foregoing may be better understood by reference to the following examples, which are presented for purposes of illustration and are not intended to limit the scope of the invention.

Example 1

A silicone membrane was prepared as described herein. An emulsion was first prepared with the components provided in Table 1. A coating of the emulsion was applied to 1 inch strips of Natures Linen® Dirt Gobbler® wipes. The emulsion soaked wipes were then cured by dipping in a calcium chloride solution containing 200 grams of deionized water and 50 grams of calcium chloride. The coating was dry to the touch upon removal from the curing solution, and formed a linen reinforced silicone coated sheet upon water evaporation.

TABLE 1

Composition for Membrane Preparation

| Component | | Amount (grams) |
|---|---|---|
| Hydroxyl-terminated polysiloxane | silanol functional polydimethylsiloxane (Andisil ® OH 80,000 cps) | 40.00 |
| Crosslinker | gamma-methacryloxypropyltrimethoxysilane (Xiameter ® OFS-6030) | 2.00 |
| Tin Catalyst | dimethyltin dineodecanoate (ACT-028, Fomrez ® catalyst UL-28 from Momentive Performance Materials) | 0.07 |
| Surfactant | 3-(polyoxyethylene)propylheptamethyltrisiloxane (Dow Corning ® 502 W additive) | 2.00 |
| Water | Water-stir 30 seconds | 1.00 |
| Water | Water-stir 30 seconds | 2.00 |
| Water | Water-stir 30 seconds | 5.00 |
| Water | Water-stir 30 seconds | 20.00 |

Prophetic Example A

A silicone membrane can be prepared as described herein. An emulsion with can be prepared by preparing a premix of a hydroxyl-terminated polysiloxane (40-60 wt %), a crosslinker (e.g., aminopropyltrimethoxy silane) (1-3 wt %), and a tin catalyst (e.g., dimethyltin dineodecanoate) (0.1-1 wt %). The mixture can be stirred until a uniform mixture is obtained. A second premix can be prepared with a surfactant (e.g., Dow Corning® 502W or Dow Corning® 67) (1-3 wt %) with an equal portion of water. The second premix can be slowly added to the stirring mixture of the first premix, with continued agitation and scraping of the container sides to achieve a high solids (e.g., ≥90%) transparent gel structure. Water can then be added to dilute to about 50% solids. A pH-adjuster (e.g., AMP-95®) can be added to adjust the pH (e.g., greater than or equal to 9.5). The resulting emulsion can be reinforced with a filler (e.g., colloidal silica, such as Nalco® 1115), and pigmented (e.g., using titanium dioxide pre-dispersed in an anionic surfactant and water). The emulsion can be applied to a selected substrate. The silicone composition coating the substrate can be cured by dipping in an aqueous salt solution (e.g., calcium salts or magnesium salts). The membrane can be dried and cut to a selected dimension. One or more steps in the process can be repeated to provide a membrane of the desired thickness.

Prophetic Example B

A silicone membrane can be prepared with the same components as Prophetic Example A, except that the tin catalyst is omitted, and the crosslinker is replaced with the following aminoxy functional silicone crosslinker:

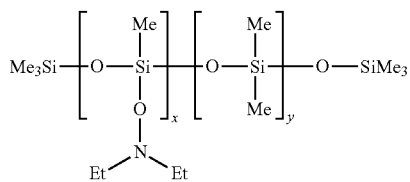

wherein x is 3, 4, or 5, and y is 2, 3, or 4.

A lower amount of pH adjuster (e.g., AMP-95®) would likely be required in this example.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A method of preparing a membrane, comprising:
   (a) providing an emulsion that includes crosslinked polysiloxane and a surfactant;
   (b) applying the emulsion to a substrate to form an emulsion soaked substrate;
   (c) contacting the emulsion soaked substrate with an aqueous salt bath to thereby form a pre-dried membrane including the substrate and a cured silicone composition; and
   (d) drying the pre-dried membrane.

2. The method of claim 1, wherein the aqueous salt bath comprises a calcium or magnesium salt.

3. The method of claim 1, wherein the emulsion further comprises a pH-adjuster, a filler, a pigment, or any combination thereof.

4. The method of claim 1, wherein steps (b) and (c) are repeated to provide a selected membrane thickness.

5. The method of claim 1, wherein step (c) comprises passing the emulsion soaked substrate through the aqueous salt bath.

6. The method of claim 1, wherein the emulsion is prepared by combining the following:
   (i) 40 to 60 wt % of a hydroxyl-terminated polysiloxane;
   (ii) 1 to 3 wt % of a crosslinker;
   (iii) 0.1 to 1 wt % of a catalyst;
   (iv) 1 to 3 wt % of a surfactant; and
   (v) 40 to 60 wt % water,
wherein wt % is based on total weight of the composition.

7. The method of claim 6, wherein the hydroxyl-terminated polysiloxane has a viscosity of 20,000 to 300,000 cps.

8. The method of claim 6, wherein the hydroxyl-terminated polysiloxane has formula:

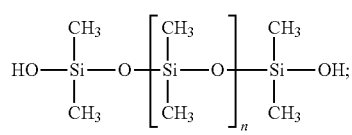

wherein n ranges from 10 to 1,000.

9. The method of claim 6, wherein the crosslinker is an alkoxy silane, an oxime silane, or an acetoxy silane.

10. The method of claim 6, wherein the crosslinker is methyltrimethoxysilane or aminopropyltrimethoxysilane.

11. The method of claim 6, wherein the catalyst is dimethyltin dineodecanoate, dibutyl tin dilaurate, or stannous octoate.

12. The method of claim 6, wherein the surfactant is 3-(polyoxyethylene)propylheptamethyltrisiloxane.

13. The method of claim 6, wherein the emulsion further comprises a pH-adjuster, a filler, a pigment, or any combination thereof.

14. The method of claim 6, where the surfactant is selected from the group consisting of ethoxylated long chain alcohols, ethoxylated 3-hydroxypropylheptamethyltrisiloxane, ethoxylated silicone polyether, polyalkyleneoxide modified heptamethyltrisiloxane, polydimethylsiloxane, polyalkyleneoxide polysiloxane, or any combination thereof.

15. The method of claim 1, wherein the emulsion is prepared by combining the following:
(i) hydroxyl-terminated polysiloxane;
(ii) crosslinker;
(iii) catalyst;
(iv) surfactant; and
(v) water.

16. The method of claim 15, wherein the hydroxyl-terminated polysiloxane has formula:

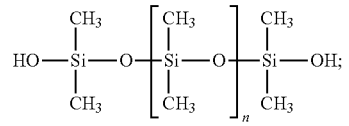

wherein n ranges from 10 to 1,000.

17. The method of claim 1, where said step of drying the pre-dried membrane forms a dried membrane, and further comprising the step of rolling the dried membrane.

* * * * *